United States Patent [19]

Beene

[11] 4,027,224

[45] May 31, 1977

[54] POST-REGULATED SWITCHING REGULATOR CIRCUIT

[75] Inventor: Gerald W. Beene, Arlington, Tex.

[73] Assignee: Reliance Telecommunication Electronics Company, Euless, Tex.

[22] Filed: Oct. 24, 1973

[21] Appl. No.: 409,093

[52] U.S. Cl. .................................. 321/2; 323/8
[51] Int. Cl.[2] .................................. G05F 3/14
[58] Field of Search ............ 321/2; 323/8, 17, 22 F, 323/DIG. 1

[56] References Cited

UNITED STATES PATENTS 3,619,758   11/1971   Deranian .......................... 321/2

Primary Examiner—A. D. Pellinen
Attorney, Agent, or Firm—Strauch, Nolan, Neale, Nies & Kurz

[57] ABSTRACT

A post regulated switching regulating d.c.-to-d.c. converter with pulse width modulation for limiting the regulated output voltage to a magnitude which is just slightly higher than the normal regulated value if the regulation capabilities of the converter are exceeded either by increasing the input voltage above a certain amount for a given load or by decreasing the load resistance below a minimum value.

12 Claims, 2 Drawing Figures

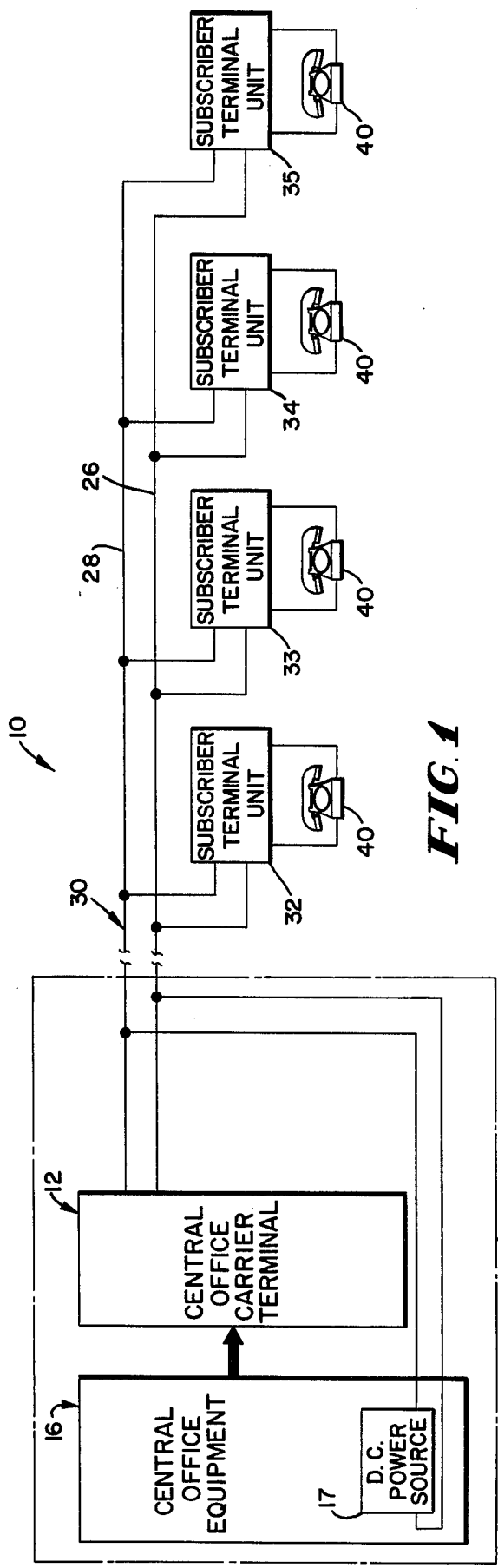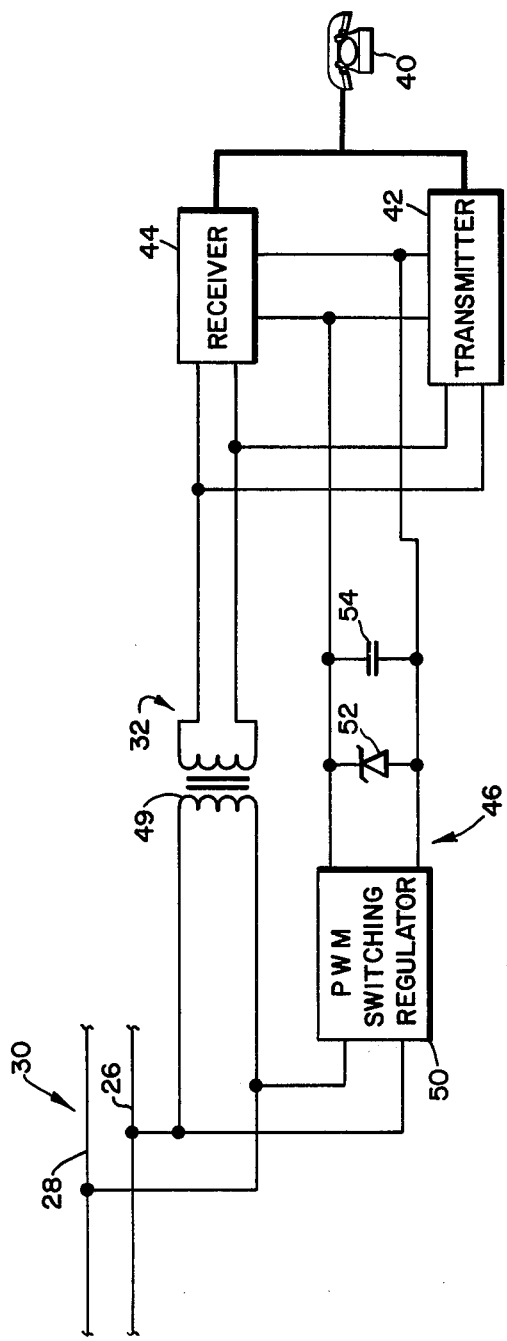

POST-REGULATED SWITCHING REGULATOR CIRCUIT

FIELD OF INVENTION

This invention relates to voltage regulating circuits and is particularly concerned with switching regulating d.c.-to-d.c. converter circuits with pulse width modulation.

BACKGROUND

In pulse width modulated switching regulating d.c.-to-d.c. converter circuits (hereinafter referred to as PWM switching regulating d.c.-to-d.c. converter circuits or simply as PWM switching regulators) direct current at one voltage is converted to direct current at a lower voltage by applying relatively high voltage pulses to periodically charge a capacitor to the lower voltage and by applying the lower voltage, which is built-up across the capacitor, to feed direct current to the load at the lower voltage. The regulating portion of such a converter circuit is effective to regulate the duration or width of each charging pulse in such a manner that the charge stored on the capacitor will be just enough to restore the voltage across the capacitor to the pre-selected lower voltage value. In this manner, the regulated voltage which is built up across the capacitor and which is applied across the load is normally limited to a pre-selected value for certain input voltage range and a certain load resistance range.

One application of PWM switching regulating d.c.-to-d.c. converters is in a subscriber carrier telephone system in which a number of subscriber carrier units are connected at various locations to the same telephone transmission line and in which a central office d.c. power source is connected to the transmission line to supply direct current for operating the subscriber carried units. Each of the subscriber carrier units in such a system usually requires some voltage regulation and may be equipped with a PWM switching regulating d.c.-to-d.c. converter which provides a regulated voltage for operating the subscriber's transmitter and receiver carrier equipment.

A problem with PWM switching regulating d.c.-to-d.c. converters is that the regulated output voltage will objectionably rise if the input voltage exceeds a certain maximum value or if the laod resistance is decreased below a certain minimum value. Both of these conditions may occur in the type of subscriber carrier system described above.

The input voltage to the PWM switching regulators in the subscriber carrier units will exceed a normal operating voltage under certain conditions in which the transmission line is not loaded to design requirements. If, for example, the number of subscriber carrier units actually connected to the transmission line is less than the number for which the carrier system is designed, line voltage drop between each subscriber carrier unit and the central office will be decreased with the result that a higher input voltage will be applied to each subscriber carrier unit.

To overcome the problem of higher-than-normal input voltages it has been the practice prior to this invention to equip the PWM switching regulator with a pre-regulator which is effective to limit the input voltage to the PWM regulator to a value which is within the regulation capabilities of the switching regulator. By limiting the input voltage to the switching regulator with a pre-regulator, the switching regulator is not exposed to excessively high input voltage and therefore may be equipped with components having a working voltage that is less than higher-than-normal input voltages to the pre-regulator.

SUMMARY AND OBJECTS OF INVENTION

A primary object of this invention is to provide a novel PWM post-regulated switching regulator which eliminates the need for pre-regulation and which effectively handles loads of small resistance.

The foregoing and othe objects of this invention are achieved in the illustrated embodiment by a shunt type post regulator which is connected across the load in parallel with the capacitor that is charged by the PWM switching regulator. The post regulator in this invention may be a Zener diode.

In this invention the post regulator is effective to conduct only when the regulated output voltage rises by a certain, but small amount above the desired operating voltage. When the post regulator conducts in this invention, it will limit the voltage across the capacitor and across the load to an amount that is just slightly higher than the desired output voltage regardless of how small the load resistance is.

When the present invention is incorporated into the previously described carrier system, the additional current which is drawn when the post regulator conducts causes the line voltage drop to increase. As a result, the input voltage to the PWM switching regulator is decreased without requiring any pre-regulation.

As compared with prior pre-regulated PWM switching regulators, the post-regulated switching regulator of this invention is cheaper to manufacture and is more efficient. In this invention the working voltage of the post regulator need only be slightly higher than the desired regulator voltage. In comparison, the components of a pre-regulator must have a significantly higher working voltage because they will be exposed to the excessively high input voltages. Furthermore, pre-regulators in prior circuits tend to reduce the efficiency of the regulator circuit at the lower, normal operating voltage.

Thus, another object of this invention is to provide a novel post-regulated PWM switching regulator which is more efficient and less costly as compared with prior pre-regulated PWM switching regulators.

These and other objects will appear as the description preceeds in connection with the appended claims and the below-described drawings.

DESCRIPTION OF DRAWINGS

FIG. 1 is a schematic circuit diagram of a subscriber carrier telephone system which incorporates the principles of this invention; and FIG. 2 is a schematic circuit of one of the subscriber carrier terminal units which is shown in FIG. 1 and which includes a post-regulated PWM switching regulator according to a preferred embodiment of this invention.

DETAILED DESCRIPTION

Referring to FIG. 1, a subscriber carrier telephone system incorporating the principles of this invention is generally indicated at 10 and comprises a conventional central office terminal 12 which is located at a central office 14. Office 14 also has the customary central office equipment 16. The central office equipment 16 includes a suitable central office d.c. power source 17 such as an array of batterys, a d.c. generator or a rectifier.

The central office terminal 12 may include one or more carrier channel units which are coupled to conductors 26 and 28 of a two-conductor telephone transmission line 30.

Connected to transmission line 30 at various locations are a plurality of subscriber carrier terminal units which usually correspond in number to the number of carrier channel units in office 14. In this example, four subscriber carrier terminal units are shown and are indicated at 32, 33, 34 and 35. Units 32–35 and line 30 form a part of system 10, and units 32–35 are connected in parallel across conductors 26 and 28 at usually different locations which are remote from office 14. The subscriber's telephones are indicated at 40 and are connected one to each of the subscriber terminal units 32–35.

As shown in FIG. 2, each of the subscriber terminal units includes a transmitter section 42, a receiver section 44 and a post-regulated PWM switching regulator circuit 46 which is constructed in accordance with one embodiment of this invention. Sections 42 and 44 are coupled by a transformer 49 to conductors 26 and 28.

Except for the post-regulated switching regulating circuit of this invention, system 10 is conventional and may be the same as that described in U.S. Pat. No. 3,475,561 which issued on Oct. 28, 1969 to L. Q. Krasin and C. E. Greene. For a detailed explanation of the operation of system 10, reference is made to the foregoing patent, the contents of which are herein incorporated by express reference.

In brief, the receiver section 44 in each of the units 32–35 detects the carrier frequency waveform which is modulated by voice frequency signals and which is set down line 30 from only one associated carrier channel unit in terminal 12. The retrived voice frequency signals are coupled to the subscriber's telephone. In the transmitter section 42, a carrier waveform of preselected frequency is modulated by voice frequency signals which are transmitted from the subscriber's telephone. The carrier which is modulated in section 42 is transmitted by line 30 to the associated carrier channel unit in terminal 12.

As shown in FIG. 2, the post-regulated switching regulator circuit 46 of this invention comprises a constant frequency PWM switching regulating d.c.-to-d.c. converter 50, a post regulator, and a capacitor 54 for applying a regulated voltage to power the electrical components in the transmitter and receiver sections 42 and 44. The regulated output voltage from circuit 46 may also be applied to power other electrical equipment at the subscriber's terminal. In this example the post regulator of this invention is a Zener diode which is indicated at 52.

The input terminals of converter 50 are connected across conductors 26 and 28. Capacitor 54 is connected across the output terminals of converter 50 in parallel with the load which, in this case, comprises components in transmitter and receiver sections 42 and 44. Zener diode 52 is also connected across the output terminals of converter 50 in parallel with capacitor 54 and in parallel with the load. By connecting converter 50 across conductors 26 and 28 converter 50 will draw current from source 17 by way of line 30.

The Zener potential of diode 52 is selected so that it is just slightly higher than the desired normal operating voltage which is applied across the load. For example, if the desired normal operating voltage is 16 volts, the Zener potential of diode will be about 18 volts.

converter 50 may be of any suitable conventional construction. For a certain range of input voltage and a certain range of load resistances, converter 50 is effective to convert the relatively high voltage at its input to a preselected lower operating voltage by producing a d.c. pulsating voltage of constant repetition frequency to periodically charge capacitor 54 to the lower operating voltage. The load, which in this example comprises components of transmitter and receiver sections 42 and 44, draws current at the lower operating voltage from the charge stored on capacitor 54. The pulse width of the capacitor-charging pulses which are produced by converter 50 is determined by the amount of charge or energy needed to restore the voltage across capacitor 54 to the pre-selected normal operating voltage. The amount of energy needed to restore the voltage across capacitor 54 to the preselected normal operating voltage depends, in turn, upon the amount of current that is drawn by the load, and the amount of current drawn by the load varies inversely relative to the resistance of the load.

As long as the input voltage to converter 50 does not rise above a predetermined value for a given load and as long as the resistance of the load does not decrease below a predetermined value, converter 50, by controlling the pulse widths of its output pulses is effective to limit the voltage built up across capacitor 54 to the normal pre-selected operating voltage. Since the Zener potential is just slightly higher than this normal operating voltage, it will not be biased far enough to be conductive as long as converter 50 is effective to limit the voltage built up across capacitor 54 to the normal operating voltage. Under such a condition, therefore, diode 52 is not conducting so that no current is shunted around capacitor 54. Zener diode 52 consequently draws no significant current and dissipates no significant power as long as converter 50 is effective to limit the voltage which is applied to the load to the normal pre-selected operating value.

If the input voltage to converter 50 rises high enough to exceed the regulation capabilities of the converter, the output or operating voltage will rise, but because of Zener diode 52, it will only rise by a small amount. Thus, when the voltage across capacitor 54 exceeds the normal operating voltage value and becomes closely equal to the Zener potential of diode 52, diode 52 will conduct. When diode 52 conducts it will prevent the operating voltage across capacitor 52 from rising above its zener potential, and by virtue of passing current through diode 52, the excess power, which would otherwise charge capacitor 54, is dissipated in the shunt-regulating Zener diode.

Therefore, the regulated operating voltage which is applied across the load with the post-regulated PWM switching regulating circuit of this invention will either be some pre-selected normal operating value V or the voltage value V plus a small increment of voltage V which is closely equal to the difference between the normal operating voltage and the Zener potential of diode 52. For the previously given numerical example, the regulated operating voltage which is applied to the load with the regulating circuit of this invention will be either 16 volts or 18 volts. The operating voltage will be 16 volts when Zener diode 52 is not conducting and will be 18 volts when diode 52 is biased into conduction. Zener diode 52 thus performs a post-regulating function in that it effectively catches and limits the operating voltage when the input voltage to converter 50 becomes so large that converter 50 connor reduce it for a given load.

In system 10, the input voltage to converter 50 could rise independently of the resistance of the load to which the regulated voltage is applied. Such a condition would occur when line 30 is not loaded to design requirements. For example, if line 30 is properly loaded with all four subscriber terminal units connected to the transmission line and if units 33–35 are for some reason not connected to or disconnected from line 30, the input voltage to converter 50 in unit 32 will be increased significantly over the value that it would have ifall four subscriber terminal units were connected to the transmission line. With the postregulating switching regulating circuit of this invention, however, no pre-regulation is required under the foregoing condition or any other condition that would cause the input voltage to converter 50 to be increased sufficiently to exceed the converter's regulation capabilities. In this invention there is no pre-regulation at the input to circuit 46, for none is needed.

If the input voltage to converter 50 rises high enough to cause Zener diode 52 to conduct, the effective short which diode 52 provides across the loads draws increased current from source 17, and the increased current flowing through line 30 increases the voltage drop between source 17 and converter 50 to thereby prevent the input voltage to converter 50 from becoming excessively high. It will be appreciated that the input voltage to converter 50 will not rise too much above a regulatable value before diode 52 conducts. In this manner, Zener diode 52 prevents the application of excessively high voltages to the input of converter 50. Converter 30 may therefore be equipped with components which have a lower working voltage than that which would be needed if the input voltage were not limited.

In carrier telephone systems and also in voice frequency telephone transmission systems, the resistance of the load which is connected to draw current from the charge on capacitor 54 will have on value when the subscriber's telephone is in its on-hook condition (i.e., when the telephone hookswitch is open) and will decrease significantly to a lower value when the subscriber's telephone is transferred to its off-hook condition in which the telephone hookswitch is closed. But regardless of how great the load resistance is diode 52 prevents the regulated voltage from exceeding the pre-selected Zener potential.

Zener diode 52 may be reverse biased by the voltage built up across capacitor 54, but as long as converter 50 is effective to limit the voltage across capacitor 54 to the desired operating voltage value, diode 52 will not be biased far enough to conduct and will therefore present an effectively open circuit.

It will be appreciated that the voltage regulating circuit is not limited in its application to carrier telephone systems. Instead, it has numerous applications in various telephone circuits and other kinds of circuits where it is desired to eliminate the need for pre-regulation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of regulating voltage with a voltage regulating circuit in which a PWM switching regulating d.c.-to-d.c. converter is normally effective to limit the regulated voltage across a load to a pre-selected magnitude, said method comprising the step of post-regulating said converter by establishing a current-conducting path across said load only when said regulated voltage rises by a pre-selected amount above said pre-selected magnitude.

2. A method of regulating voltage in a circuit in which a PWM switching regulating d.c.-to-d.c. converter applies a pulsating voltage to charge a capacitor, in which a load is connected across said capacitor to draw current from the charge stored on the capacitor at the voltage built up across said capacitor, and in which said converter is normally effective within its voltage-regulating capability to limit the voltage build-up across said capacitor to a pre-selected magnitude, said method comprising the step of post-regulating said converter by establishing a current conducting path across said capacitor and said load only when the converter's regulation capability is exceeded to cause the voltage buildup across said capacitor to rise by a pre-selected amount above said pre-selected magnitude.

3. A voltage regulating circuit for regulating the voltage applied across a load and comprising a capacitor, a PWM switching regulating d.c.-to-d.c. converter having an output connected to said capacitor and an input which is adapted to be electrically connected to a d.c. power source for drawing current from said source to charge said capacitor, said capacitor being adapted to be electrically connected across said load so that said load draws current from the charge stored on said capacitor at the voltage built up across said capacitor, said converter being normally effective to regulate the voltage built up across said capacitor and to limit the regulated voltage to a pre-selected magnitude, and a voltage shunt regulator connected across said capacitor at the output of said converter to provide post regulation for said converter, said regulator being rendered effective only when said regulated voltage increases by a pre-selected amount above said pre-selected magnitude to limit the regulated voltage to a value which is a pre-selected amount higher than said pre-selected magnitude.

4. The voltage regulating circuit defined in claim 3 wherein said voltage shunt regulator is a Zener diode.

5. In combination with a load, a post-regulated PWM switching regulator circuit which is effective (a) to limit the voltage applied across said load to a first pre-selected magnitude when the input voltage to said regulator is not higher than a predetermined maximum value for a given load and when the resistance of said load is not greater than a predetermined maximum amount, and (b) to limit the voltage applied across said load to a second pre-selected magnitude when said input voltage rises above said maximum value or when the resistance of said load is greater than said maximum amount, said second pre-selected magnitude being greater than said first pre-selected magnitude.

6. A voltage regulating circuit for regulating the voltage applied across a load and comprising a capacitor, a PWM switching regulating d.c.-to-d.c. converter having an output connected to said capacitor and an input which is adapted to be electrically connected to a d.c. power source for drawing current from said source to charge said capacitor, said capacitor being adapted to be electrically connected across said load so that said load draws current from the charge stored on said capacitor at the voltage built up across said capacitor, said converter being normally effective to regulate the voltage built up across said capacitor and to limit the regulated voltage to a pre-selected magnitude, and a post-regulating voltage shunt regulator connected across said capacitor at the output of said converter and rendered effective only by a pre-selected rise in said regulated voltage above said pre-selected magnitude to establish a current conducting path across said capacitor to limit the rise in said regulated voltage.

7. The voltage regulating circuit defined in claim 6 wherein said post-regulating voltage shunt regulator is a Zener diode.

8. A voltage regulating circuit for regulating the voltage applied across a load and comprising a capacitor, a PWM switching regulating d.c.-to-d.c. converter having an output connected to said capacitor and an input which is adapted to be electrically connected to a d.c. power source for drawing current from said source to charge said capacitor, said capacitor being adapted to be electrically connected across said load so that said load draws current from the charge stored on said capacitor at the voltage built up across said capacitor, said converter being normally effective to regulate the voltage built up across said capacitor and to limit the regulated voltage to a pre-selected magnitude, and a post-regulating Zener diode connected across said capacitor at the output of said converter and having a pre-selecter Zener potential which is greater than said pre-selected magnitude by a pre-selected amount.

9. In combination with a load, a voltage regulating circuit comprising a capacitor, a PWM switching regulating d.c.-to-d.c. converter having an input adapter to be electrically connected to a d.c. power source and an output connected to said capacitor for drawing current from said source to charge said capacitor, said load being connected to said capacitor to draw current from the charge stored on said capacitor at the voltage built up across said capacitor, said converter being normally effective to regulate the voltage across said capacitor and to limit the regulated voltage to a pre-selected magnitude, and a post regulating Zener diode connected across said capacitor and said load at the output of said converter, said Zener diode having a Zener potential which is higher than said pre-selected magnitude of said regulated voltage by a pre-selected amount so that said diode is non-conductive when said converter is effective to limit the regulated voltage to said pre-selected magnitude, but becomes conductive to limit the regulated voltage to said Zener potential when said converter becomes ineffective to limit said regulated voltage to said pre-selected magnitude.

10. In a transmission system, a telephone transmission line having first and second conductors, a source of d.c. power electrically connected to said line to apply d.c. voltage across said conductors, a capacitor, a PWM switching regulating d.c.-to-d.c. converter having an input connected to said line remotely from said cource and an output connected to said capacitor to draw current from said source for charging said capacitor, a load connected to said capacitor to draw current from the charge stored on said capacitor at the voltage built up across said capacitor, said converter being normally effective to regulate the voltge built up across said capacitor and to limit the regulated voltage to pre-selected magnitude, and a voltage shunt regulator connected across said capacitor to provide post regulation for said converter, said regulator being rendered effective only by a pre-selected increase in said regulated voltage above said pre-selected magnitude to limit the regulated voltage to a magnitude which is pre-selected amount greater than said pre-selected magnitude.

11. The telephone transmission system defined in claim 10 wherein said voltage shunt regulator is a Zener diode.

12. In a telephone transmission system, a telephone, means comprising a two-conductor transmission line for connecting said telephone to a central office, a source of d.c. power located at said central office and connected to apply a d.c. voltage across the conductors of said line, a capacitor, a PWM switching regulating d.c.-to-d.c. converter having an input connected to said line remotely from said central office and an output connected to said capacitor for drawing current from said source to charge said capacitor, a load connected across said capacitor to draw current from the charge stored on said capacitor at the voltage built up across said capacitor, said converter being normally effective to regulate the voltage built up across said capacitor and to limit the regulated voltage to a pre-selected magnitude, and a Zener diode connected across said capacitor and said load at the output of said converter, said Zener diode having a Zener potential which is higher than said pre-selected mangitude of said regulated voltage by a pre-selected amount so that said diode in non-conductive when said converter is effective to limit said regulated voltage to said pre-selected magnitude, but becomes conductive to limit the regulated voltage to said Zener potential and to increase the current that is drawn from said source when said converter becomes ineffective to limit said regulated voltage to said pre-selected magnitude.

* * * * *